United States Patent
Shand et al.

(10) Patent No.: US 7,496,644 B2
(45) Date of Patent: Feb. 24, 2009

(54) METHOD AND APPARATUS FOR MANAGING A NETWORK COMPONENT CHANGE

(75) Inventors: Ian Michael Charles Shand, Cobham (GB); Stewart Frederick Bryant, Redhill (GB)

(73) Assignee: Cisco Technology, Inc., San Jose, CA (US)

(*) Notice: Subject to any disclaimer, the term of this patent is extended or adjusted under 35 U.S.C. 154(b) by 805 days.

(21) Appl. No.: 10/981,823

(22) Filed: Nov. 5, 2004

(65) Prior Publication Data
US 2006/0101158 A1    May 11, 2006

(51) Int. Cl.
*G06F 15/177*    (2006.01)
(52) U.S. Cl. .................. 709/221; 709/220; 709/223; 709/238; 709/239
(58) Field of Classification Search ............... 709/220, 709/221, 223, 238, 239
See application file for complete search history.

(56) References Cited

U.S. PATENT DOCUMENTS

| | | | |
|---|---|---|---|
| 5,627,822 A * | 5/1997 | Edmaier et al. | 370/218 |
| 5,652,751 A * | 7/1997 | Sharony | 370/227 |
| 5,854,899 A * | 12/1998 | Callon et al. | 709/238 |
| 5,959,968 A | 9/1999 | Chin et al. | |
| 6,111,257 A | 8/2000 | Shand et al. | |
| 6,295,275 B1 | 9/2001 | Croslin | |
| 6,343,122 B1 | 1/2002 | Andersson | |
| 6,349,091 B1 | 2/2002 | Li | |
| 6,473,421 B1 | 10/2002 | Tappan | |
| 6,507,577 B1 | 1/2003 | Mauger et al. | |
| 6,690,671 B1 | 2/2004 | Anbiah et al. | |
| 6,714,551 B1 | 3/2004 | Le-Ngoc | |
| 7,058,016 B1 | 6/2006 | Harper | |
| 7,260,645 B2 | 8/2007 | Bays | |
| 2002/0112072 A1 | 8/2002 | Jain | |
| 2002/0147800 A1 * | 10/2002 | Gai et al. | 709/221 |
| 2002/0171886 A1 | 11/2002 | Wu et al. | |
| 2003/0193959 A1 | 10/2003 | Lui et al. | |
| 2004/0001497 A1 | 1/2004 | Sharma | |
| 2004/0071089 A1 | 4/2004 | Bauer et al. | |

(Continued)

FOREIGN PATENT DOCUMENTS

CN    1440159 A    9/2003

OTHER PUBLICATIONS

Atlas, Alia, "Avici Systems—Statement about IPR Claimed in draft-atlas-ip-local-protect," Received on Apr. 12, 2004 from Alia Atlas, 1 page.

(Continued)

*Primary Examiner*—Phuoc H Nguyen
(74) *Attorney, Agent, or Firm*—Hickman Palermo Truong & Becker LLP

(57) ABSTRACT

A method is disclosed of managing a network component change in a data communications network having as components nodes and links defining a pre-change topology. A transitioning node forwards all data assigned to the pre-change topology via the pre-change topology. The transitioning node defines a post-change topology. The transitioning node transitions from the pre-change to the post-change topology. Data assigned to the pre-change topology is assigned to the post-change topology, and the transitioning node forwards the data via the post-change topology.

54 Claims, 6 Drawing Sheets

U.S. PATENT DOCUMENTS

2005/0007950 A1 1/2005 Liu
2005/0050220 A1* 3/2005 Rouyer et al. ............... 709/232
2005/0097219 A1 5/2005 Goguen et al.

OTHER PUBLICATIONS

Atlas, Alia, et al., "IP/LDP Local Protection", IETF 59 Routing Area Meeting, draft-atlas-ip-local-protect-00.txt, PowerPoint Presentation, MPLS World Congress 2003, 6 pages.
Atlas, Alia, "draft-atlas-ip-local-protect-00," Internet-Drafts Database Interface, printed Oct. 20, 2006, 1 page.
Atlas, Alia, et al., "IP/LDP Local Protection," Internet Draft, draft-atlas-ip-local-protection-00.txt, Aug. 2004, 30 pages.
Gray, Robert S., et al., "Outdoor Experimental Comparison of Four Ad Hoc Routing Algorithms," MSWiM'04, Oct. 4-6, 2004, Venezia, Italy, Copyright 2004 ACM 1-58113-953-5, 10 pages.
AU Examiner's First Report for foreign patent application No. 2004311004 dated Jun. 23, 2008 (1 pg).
AU Examiner's Second Report for foreign patent application No. 2004311004 dated Aug. 18, 2008 (1 pg).
Current claims for AU foreign patent application No. 2004311004 (6 pgs).
Office Action from CN for foreign application No. 200480033007.8 dated Apr. 11, 2008 (10 pgs) with English translation (11 pgs).
Current claims for CN foreign patent application No. 200480033007.8 (6 pgs).

* cited by examiner

METHOD AND APPARATUS FOR MANAGING A NETWORK COMPONENT CHANGE

FIELD OF THE INVENTION

The present invention relates to a method and apparatus for managing a network component change.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet to the next node along that route. The next node repeats this step and so forth.

It will be noted that in normal forwarding each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change in the network, a new LSP is propagated that induces creating a loop in the RIB or FIB. As an example, if node A sends a packet to node Z via node B, comprising the optimum route according to its SPF, a situation can arise where node B, according to its SPF determines that the best route to node Z is via node A and sends the packet back. This can continue for as long as the loop remains although usually the packet will have a maximum hop count after which it will be discarded. Such a loop can be a direct loop between two nodes or an indirect loop around a circuit of nodes.

One solution that has been proposed to the looping problem is described in co-pending patent application Ser. No. 10/340,371, filed 9 Jan. 2003, entitled "Method and Apparatus for Constructing a Backup Route in a Data Communications Network" of Kevin Miles et al., ("Miles et al."), the entire contents of which are incorporated by reference for all purposes as if fully set forth herein and discussed in more detail below. According to the solution put forward in Miles et al, where a repairing node detects failure of an adjacent component, then the repairing node computes a first set of nodes comprising the set of all nodes reachable according to its protocol other than nodes reachable by traversing the failed component. The repairing node then computes a second set of nodes comprising the set of all nodes from which a target node is reachable without traversing the failed component. The method then determines whether any intermediate nodes exist in the intersection between the first and second sets of nodes or a one-hop extension thereof and tunnels packets for the target node to a tunnel end point comprising a node in the intersection of the first and second sets of nodes. An extension of the approach is described in co-pending patent application Ser. No. 10/442,589, filed 20 May 2003, entitled "Method and Apparatus for Constructing a Transition Route in a Data Communications Network" of Stewart F. Bryant et al., (Bryant et al) the entire contents of which are incorporated by reference for all purposes as if fully set forth herein, and in which the approach can be extended to cover repairs for non-adjacent nodes.

Whilst such systems provide rapid network recovery in the event of a failed component, in some instances loops can occur. One such instance can be where two concurrent unrelated failures take place in the network. In that case a first repairing node adjacent the first failed component will institute its own first repair strategy and forward a packet according to that strategy, relying on the remaining nodes in the repair path using their normal forwarding. If, however, the packet traverses a second repairing node independently repairing around a second failed component, a loop may occur. In particular the second repairing node will have instituted its own repair strategy differing from normal forwarding and accordingly may return packets from the first repairing node back towards the first repairing node, giving rise to a loop. It will be apparent that such a problem can also arise in the transition route approach described above in Bryant et al and indeed in any case where a repair strategy is distributed across multiple nodes in a network.

Yet a further extension of known techniques is described in co-pending patent application Ser. No. 10/685,621 entitled "Method and Apparatus for Generating Routing Information in a Data Communications Network" of Michael Shand et al (hereinafter "Shand", the entire contents of which are incorporated by reference for all purposes as if fully set forth herein. According to Shand nodes affected by a network failure are updated in a predetermined sequence to avoid looping. In this case it will be seen that problems still arise when multiple failures occur in the network. For example, assuming that the links A and B both fail at separate points in the network, a node C may find that it has to change in a first epoch for some destination D as a result of failure A and has to change in a second, separate epoch for the same destination D as a result of failure B with a conflicting sequential update strategy adopted for that failure. It will be seen that such concurrent failures cannot be converged using the approaches described above.

In the case that the failures are non-conflicting, that is, can be repaired by non-conflicting strategies, one possible solution is to order the invocation of convergence for each failure.

However this requires the repair to remain in place longer which increases the time for which the network is vulnerable to a new potentially conflicting failure and extends the time for which repair paths are in use.

An alternative approach is described in "ip/ldp local protection" which is available at the time of writing on the file "draft-atlas-ip-local-protect-01.txt" in the directory "pub/id" of the domain "watersprings.org" on the World Wide Web. According to the approach described in this document, a computing node computes both a "primary next-hop" for packets for a destination together with an "alternate next-hop". The alternate next hop is used in the case of failure of the primary next hop (failure either of the next-hop node or the link to the next hop-node). The alternate next-hop can be another neighbor node whose own shortest path to the destination does not include the computing node. In another case the alternate next-hop is a "U-turn alternate" comprising a neighbor whose primary next hop is the computing node, and which has as its alternate next-hop a node whose shortest path does not include the computing node. Although this document addresses multiple failure loop-free protection in some instances, this is only in the case of shared risk link groups (SRLGs), requires a signaling extension and is topology sensitive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing a network component is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Managing a Network Component Change
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for managing a network component change in a data communications network having as components nodes and links, defining a pre-change topology. The method comprises the steps, performed at a transitioning node, of forwarding all data assigned to the pre-change topology via the pre-change topology. Data assigned to the pre-change topology is assigned to the post-change topology and the transitioning node defines a post-change topology and transitions from the pre-change to the post-change topology. The transitioning node forwards all data via the post-change topology.

In other aspects, the invention encompasses a computer apparatus and a computer-readable medium configured to carry out the foregoing steps.

2.0 Structural and Functional Overview

Figure 1:
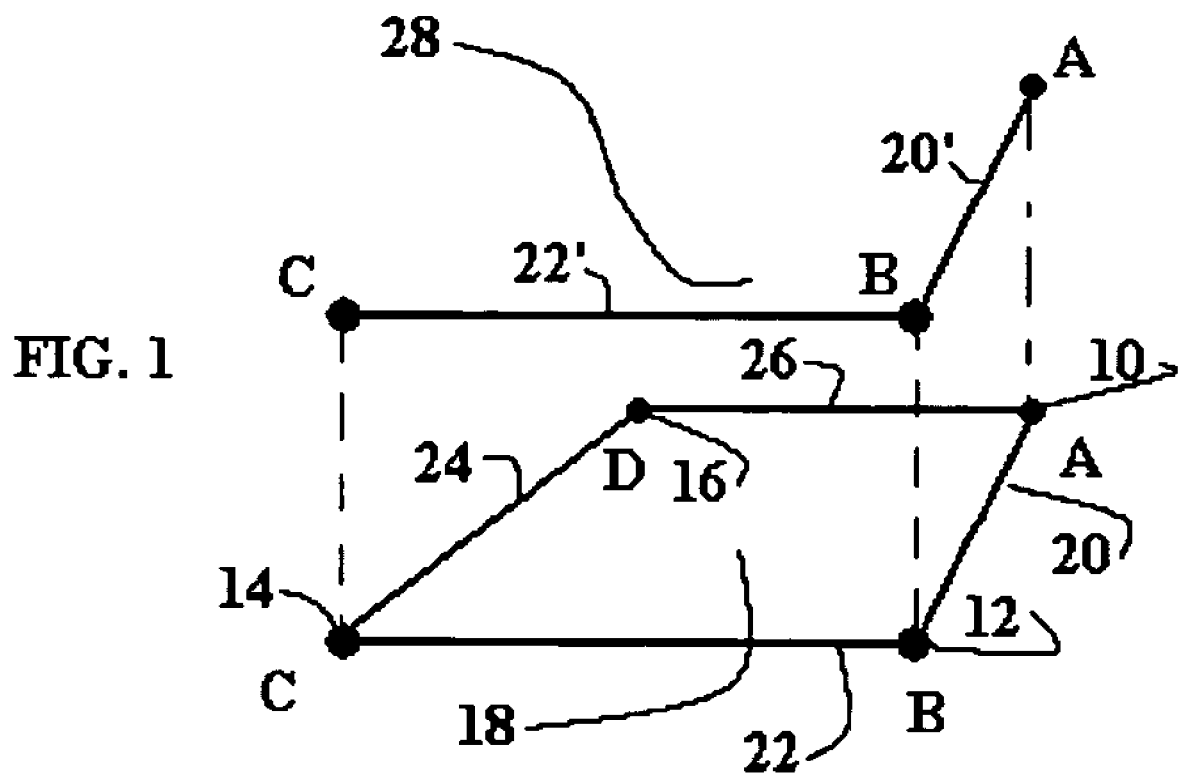
FIG. 1 is a representation of a network supporting multi-topology routing.

In overview a method for managing a network component change can be understood with reference to FIG. 1 which depicts an illustrative network diagram to which the method is applied. In particular a multi-topology routing (MTR) domain is provided as described in more detail below, including a pre-change topology and post-change topology. Where, for example, a network component change comprises a component failure such as a node or link failure, the pre-change topology represents the network topology as though the failures had not occurred. Each node continues forwarding according to the pre-change topology but concurrently defines and converges on a post-change topology representing the network excluding the failed component. Each node then transitions to the post-change topology. It will be seen that any number of changes can be represented in the post-change topology providing a system which can accommodate multiple concurrent failures.

In the network shown in FIG. 1 nodes A, reference numeral 10, B, reference numeral 12, C, reference numeral 14 and D, reference numeral 16 comprise a fragment of a data communications network forming a pre-change topology designated generally 18. A link 20 joins nodes A and B, a link 22 joins nodes B and C, a link 24 joins nodes C and D and a link 26 joins nodes A and D.

If, say, node D fails, a post-change topology 28 is defined sharing nodes A, B and C and the common links 20, 22 between them (denoted here 20', 22' for the purposes of clarity of illustration). Accordingly the nodes simply transition to the post-change topology to circumvent the failure.

It will be appreciated that the topology described with reference to FIG. 1 relates to a fragment of a network and that the entire network can be treated similarly. As a result multiple failures can be accommodated irrespective of the cause of them which may be, for example, a shared risk group or mere coincidence by providing an appropriate post-change topology along which packets can be sent.

It will further be appreciated that transitioning between the pre-change and post-change topologies must be managed to avoid potential loops and a strategy for attending to this is described in more detail below. Synchronization techniques to accommodate multiple failure reports in a given period of time or epoch are also set out below.

The approach can extend to any appropriate change in the network including, for example, traffic dependent metrics in which aspects of the network such as link costs are continuously varied dependent on instantaneous traffic volume to smooth the load across the network. In that case the possibility of "continuous tuning" is providing according to the method described herein as set out in more detail below.

3.0 Method and Apparatus for Managing a Network Component Change

In order to understand implementation of the method multi topology routing will be briefly described. The approach will be generally well known to the skilled reader such that detailed discussion is not required however a summary to allow an understanding of how the approach can allow transitions between pre- and post-change topologies as provided.

Multi-topology routing is described in "M-ISIS: Multi-topology routing in IS-IS" by T. Przygienda et al., which is available at the time of writing on the file "isis-wg-multi-topology-00.txt" in the directory proceedings/01mar/I-D" of the domain "IETF.org" of the World Wide Web. In multi-topology routing one or more additional topologies is overlaid on a base or default topology and different classes of data are assigned to different topologies. For example the base or default topology will be the entire network and an additional topology will be a subset of the default topology. It will be appreciated that the physical components of the network are common to both topologies but that for various reasons it may be desirable to assign certain classes of traffic to only a certain subset of the entire network as a result of which the multi-topology concept provides a useful approach to providing this functionality.

One example of the use of multiple topologies is where one class of data requires low latency links, for example Voice over Internet Protocol (VoIP) data. As a result such data may be sent preferably via physical landlines rather than, for example, high latency links such as satellite links. As a result an additional topology is defined as all low latency links on the network and VoIP data packets are assigned to the additional topology. Another example is security-critical traffic which may be assigned to an additional topology of non-radiative links. Further possible examples are file transfer protocol (FTP) or SMTP (simple mail transfer protocol) traffic which can be assigned to an additional topology comprising high latency links, Internet Protocol version 4 (IPv4) versus Internet Protocol version 6 (IPv6) traffic which may be assigned to different topologies or data to be distinguished by the quality of service (QoS) assigned to it.

Multi-topology routing can be performed in a strict or a preferred mode. In the strict mode a data packet must travel only over the assigned topology and otherwise be discarded, for example in the case of security critical traffic. In the preferred mode data packets are preferably sent over the assigned topology but may also pass through the default topology where there is no path using only the assigned topology; thus, the assigned topology is considered preferred, but not strictly required. However a constraint on preferred mode traffic is that once traffic enters its preferred topology it must travel exclusively over that topology to the destination and not reenter the default topology as otherwise looping could occur.

Accordingly it will be seen that by switching from a base, pre-change topology to an additional, post-change topology any number of failures or other changes to network components can be reflected in the post-change topology allowing the possibility of a smoothly managed transition.

It has been recognized that problems can arise in multi-topology routing domains during transitions between topologies and in particular migrating packets from one topology to another without packets looping. Such transitions can occur for example during introduction of a first or subsequent additional topology, the removal of a topology, the addition or removal of a class of data packets to or from an additional topology (other classes of data remaining within the topology) or changing a class of data between two additional topologies (other classes of data remaining within the existing topology). In such cases, assuming that each topology is stable and loop free, a single hop loop can occur if a first router classifies a packet as belonging to a first topology and forwards it to a neighboring second router. If the second router then classifies the packet as belonging to another topology it may forward the packet back to the first router, both routers having computed the shortest route to the packet destination using a different set of metrics, each appropriate to the topology to which they classified the packet. It will be seen that such a situation could arise when a transition between topologies is taking place according to which some routers have implemented the transition and others have not. A multi-hop loop can also occur if the topologies use asymmetric metrics.

Figure 2:
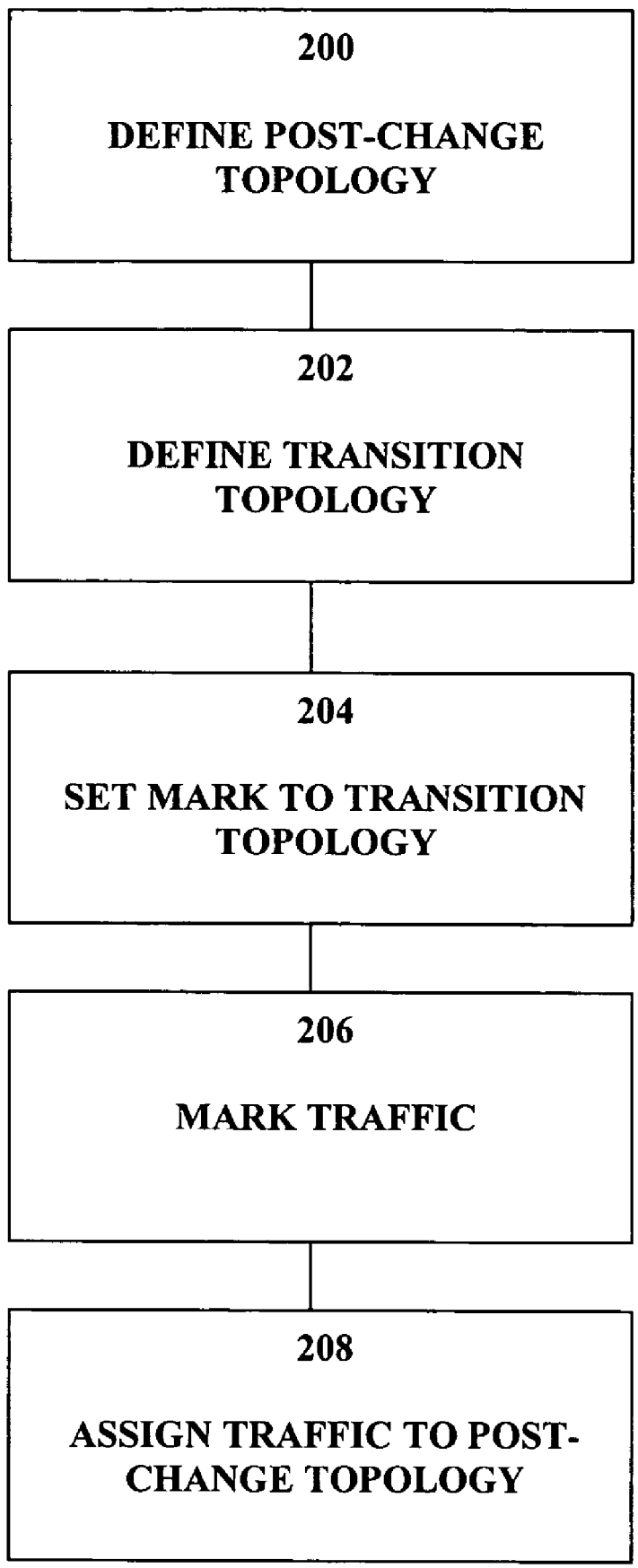
FIG. 2 is a flow diagram illustrating a high level view of a method for managing a transition between a pre-change topology and a post-change topology.

However a method and apparatus for managing a transition for a class of data between first and second topologies in a data communications network is described in co-pending patent application Ser. No. 10/890,047 of Michael Shand et al (herein after "Shand II") the entire contents of which are incorporated by reference for all purposes as if fully set forth herein. According to the solution set forth therein, a method of managing a transition between topologies in a network supporting multi-topology routing is provided as can be understood with reference to FIG. 2 which is a flow diagram illustrating a high level view of the method employed.

In block 200 a post-change topology is defined. For example with reference to the network shown in FIG. 1 the post-change topology 28. In block 202 a "transition topology" is defined and assigned a denominator allowing identification of the topology. In most circumstances the transition topology will be an existing defined topology such as the default, pre-change topology or a post-change topology and the denominator selected accordingly. Alternatively, an entirely new topology is defined as the transition topology and is assigned a new denominator.

Packets are locked into the transition topology during a transition period to avoid looping. In particular, in block 204 a marking strategy is established according to which marked packets are assigned to the transition topology. In block 206 the marking strategy is configured such that traffic is marked at the router implementing the method. A marked packet is constrained to travel in the topology assigned to the marking in block 204, i.e. to the transition topology. Marking takes priority over all other attributes when determining the topology over which a packet is to be routed. Once the marking strategy is implemented in all participating routers in block 208 marking of traffic and subsequent traffic is forwarded along the post-change topology. This step can be performed in any order amongst the participating routers. At this stage the post-change topology is an active topology. The manner in which traffic is assigned to the pre- and post change topology can be according to any appropriate classification as will be well known to the skilled reader.

Looping is avoided according to this method because the marked traffic is locked down into the transition topology whilst the marking strategy is implemented across all participating routers. As a result, if a packet is forwarded to a router that has not yet switched on the marking strategy it will be forwarded normally until it reaches its destination or is marked by another node at which point it will enter the transition topology and be locked there. Once the participating routers start to cease marking of traffic, if a packet is forwarded to a router that has not yet switched off the marking strategy, the packet is marked and forwarded to its destination using the transition topology. Because marking has priority over classification the packet is now locked into the transition topology and will be maintained in the transition topology by all other routers. Even if the routers are no longer marking traffic themselves, they will recognize a marked packet and also forward it over the transition topology. It will be noted that although the packet cannot loop, it can backtrack, that is, it may travel over a link no more than once in each direction, once in each of the transition and additional topologies.

Accordingly it will be seen that the application of this loop-free convergence mechanism provides an elegant solution to managing multiple component failures. However synchronization of the technique requires management to ensure that all transitioning nodes converge on an identical post-change topology. It is also desirable to define a system allowing multiple failures to be accommodated in a single post-change topology. As discussed in more detail below, various techniques are provided, therefore, to define "epochs" of time common between transitioning nodes. As a result skew across the network resulting in nodes transitioning between the topologies at different times is loosely synchronized and accommodated by extending the duration of each epoch to compensate for the time difference as set out below.

Figure 3:
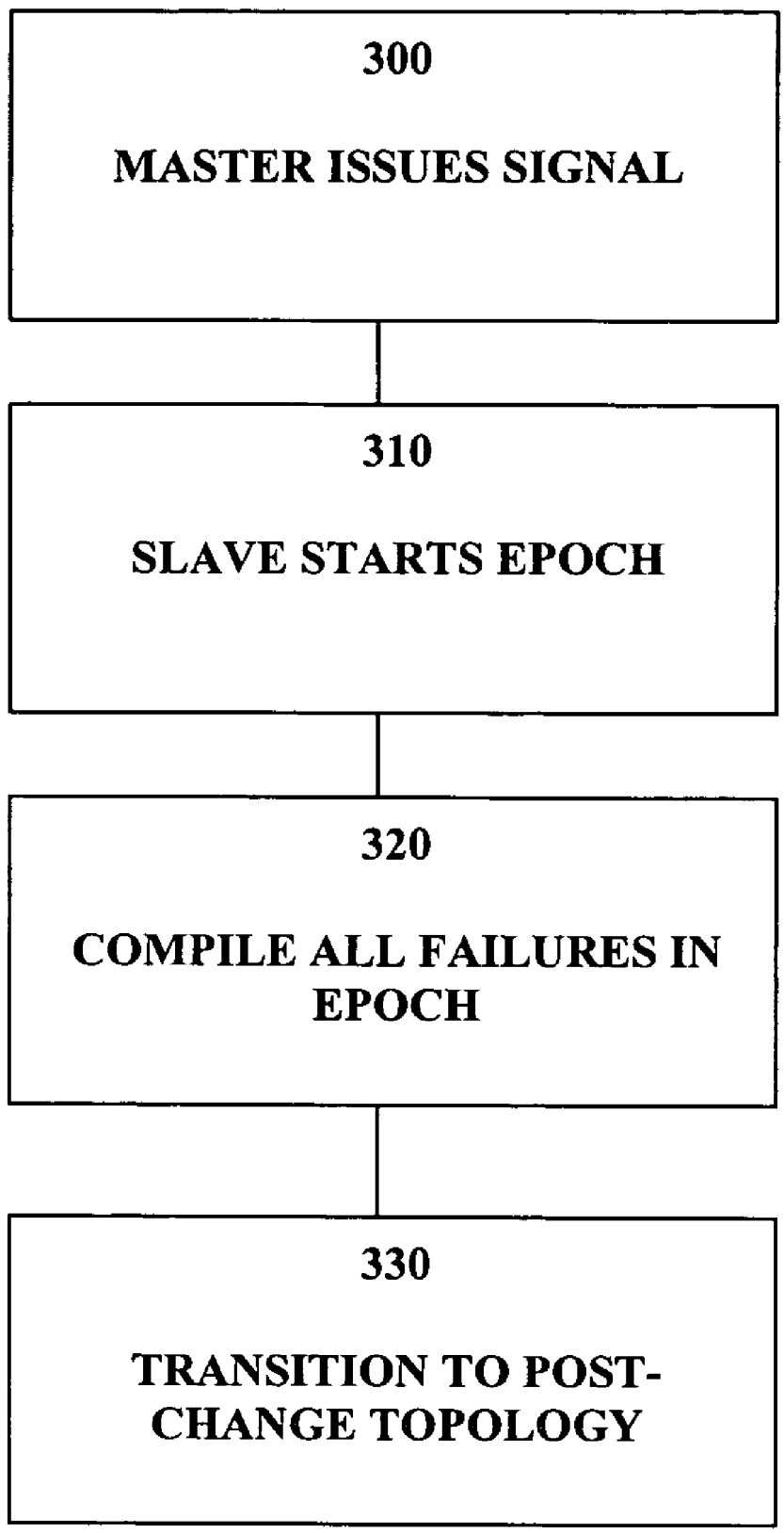
FIG. 3 is a flow diagram illustrating in more detail steps involved in managing a network component change.

A first implementation is described with reference to FIG. 3 which is a flow diagram illustrating a master-slave synchronization technique. In block 300 a master node issues a signal to start each epoch. The master node can be determined in any appropriate manner, for example by electing the node with the lowest IP loop-back address. In an optimization, to make the system robust, the master can be backed up by another node, for example the node having the second lowest IP address. Backing up can take place if the expected synchronizing action by the master does not take place within timeout period. The system remains quiescent until a topology change is detected. For example the signal issued in block 300, representing the start of an epoch, can be signaled by an LSP issued by the master node in response to receipt of an LSP from a slave node reporting a link state change. Any appropriate unicast or multi-cast technique can be used for issuing the signal.

In block 310, upon receipt of the master signal, each slave node starts its epoch which is of predetermined length. During the epoch the slave node does not advertise further LSPs but processes any incoming LSPs propagating through the network. In block 320 all failures advertised during the epoch are compiled at each transitioning node. In block 330 each node transitions to the post-change topology as discussed in more detail above with reference to FIG. 2 and the system then waits for further changes and consequent LSP advertisements to trigger block 300 again.

According to an alternative synchronization technique a dead-reckoning approach is adopted in which a common clock is distributed around the network providing a synchronization signal. For example the nodes may use Network Time Protocol (NTP) to synchronize their clocks. When a node issues an LSP describing a topology change, all other nodes in the network wait some predetermined propagation time and then execute the change on the next clock signal.

In a further synchronization implementation, time is divided into epochs denoted here (n) (n+1) and so forth. Each LSP representing a network change indicates the epoch during which the LSP was created, for example LSP (n). This indication can be, for example in the type-length-value (TLV) field of a packet, or any other appropriate indication may be used.

Figure 4:
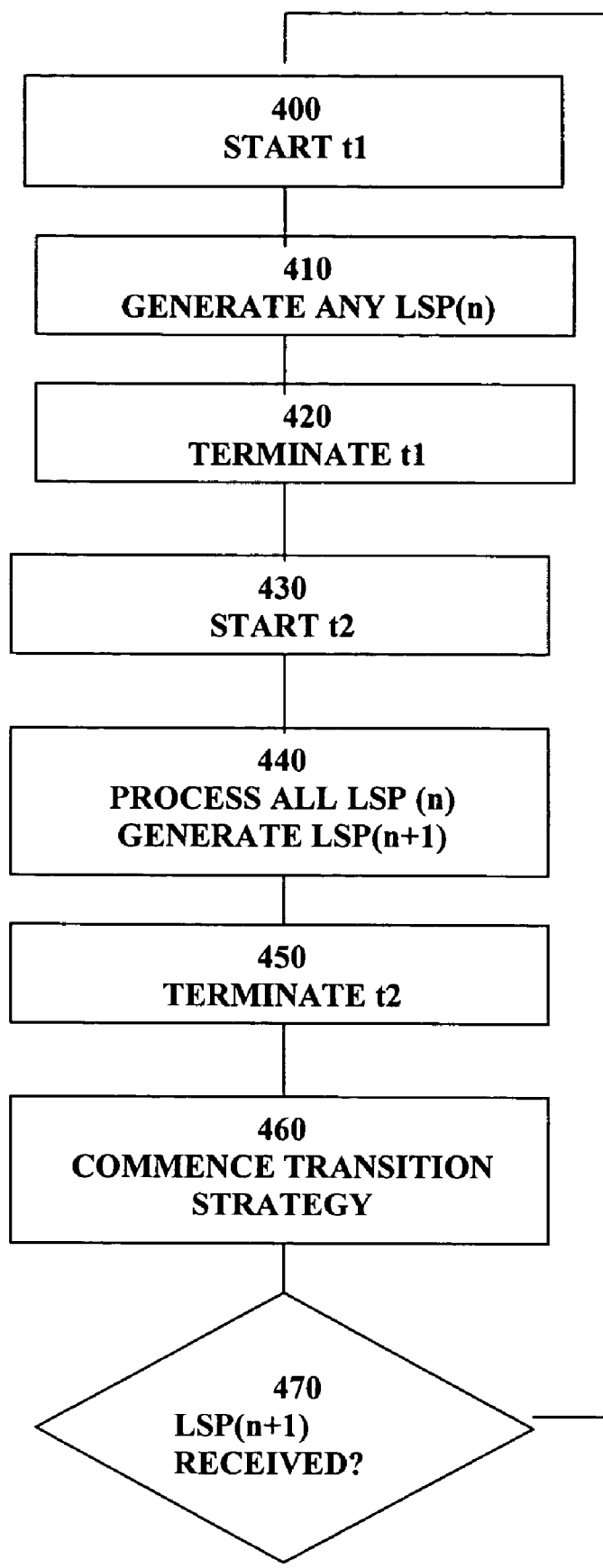
FIG. 4 is a flow diagram illustrating in more detail steps involved in managing a network change according to an alternative embodiment.

In order to collate multiple failures and take into account the time taken for an LSP to propagate through the entire network and for each node to process all LSPs and converge on a post-change topology, all LSPs representing the changes in a given epoch n (or before that epoch) are dealt with in a two-step pipeline with stages of duration $t_1$, $t_2$. The implementation can be further understood with reference to FIG. 4 which is a flow diagram illustrating a distributed synchronization technique.

In block 400 a transitioning node starts the first stage, triggering timer $t_1$. The first stage is started for example upon receipt of a first LSP (n) representing a network change in epoch n, or at the end of a further timer $t_2$ as described in more detail below. In block 410 the transitioning node generates any LSP (n) for that epoch. It will be seen that as the LSP (n) is propagated through the network all other transitioning nodes will start a corresponding timer $t_1$ upon receipt of it. In block 420 the first stage is terminated at the transitioning node. This can either be because $t_1$ times out or because of receipt of an LSP (n+1) from another node indicating that, elsewhere, a transitioning node has entered the next epoch. Accordingly the period $t_1$ comprises a hold-down period to allow all LSPs for a single event (for example a shared risk group event) to be generated by their respective nodes. As a result all of the nodes are phase locked to a common epoch clock driven by the earliest node entering the next epoch and effectively notifying the remaining nodes thereof by issuance of an LSP (n+1) or by timeout of $t_1$.

In block 430 the transitioning node starts the second stage of the pipeline triggering timer $t_2$. In block 440 the transitioning node processes LSP (n) and earlier LSPs, hence converging on the post-change topology and updates the FIB accordingly. If the router received an older LSP from epoch (n−1), (n−2) and so forth, this is an LSP that was delayed for some abnormal reason. Accordingly processing the older LSP and updating the FIB during the second stage allows convergence on the appropriate topology with no worse than the micro-looping that would denote a basic link state network.

In block 450 the transitioning node terminates the second stage timer $t_2$. Timer $t_2$ is longer than the sum of the times it takes for an LSP to propagate through the network from any node to any other node, plus the time it takes for any node to process the received LSPs and update its FIB. As a result at the timeout of timer $t_2$ all nodes are converged on the post-change topology such that the transitioning mechanism between the pre-change and post-change topology can be triggered as described above in more detail with reference to FIG. 2. Accordingly in block 460 the transitioning node commences the transitioning strategy to the post-change topology accommodating all LSP (n).

The transitioning node then enters a quiescent stage until receipt of an LSP (n+1) representing the next epoch, in block 470 at which stage the timer $t_1$ is recommenced at the next epoch. While the network remains quiescent, desynchronization of clocks at each node does not affect operation, timer commencement being triggered by propagation of an LSP representing the start of the next epoch, which resynchronizes the network.

It will be noted that if a node receives an LSP with an epoch m such that m>n+1, the node advances its epoch number to m and starts $t_1$.

The epoch number will have a finite size as it is carried in the TLV field, for example, of the LSP. As a result the epoch numbers will require periodic resetting. In an optimized approach the epoch number space can be reinitialized by making both the highest and the lowest sequence numbers zero. When a zero epoch LSP is issued all routers process all outstanding LSPs and then reset the epoch number to 1. This allows, for example, recovery from a situation in which a node issues a very high epoch number in error.

It will be seen, therefore, that a simple and reliable transitioning mechanism is provided between pre- and post-change topologies, using a separate FIB for each topology. In addition a packet marking mechanism of any type can be implemented to control the migration of packets from one topology to another as described in more detail with reference to FIG. 2 above. In one approach, for example, as the system effectively toggles between pre- and post-change topologies, simplified marking techniques can be adopted. For example a transitioning data packet can be marked with a single bit zero or 1, each representing the pre-change and post-change topology as appropriate. Alternatively packets can be unmarked unless to be transitioned or can have any appropriate alternative alternating label technique such as Multi-Protocol Label Switching (MPLS) labels.

Furthermore, each topology can be denoted in any appropriate manner for identification in a manner known in MTR. One exemplary implementation is to denote a first topology a first color, for example red and the second by a second color, blue. Accordingly, where the pre-change topology is represented by a red topology then the network can transition to a "blue" topology as a post-change topology and remain in the blue state indefinitely, only reverting to a red topology, now representing the next post-change topology, when the next topology change occurs. In that case the network toggles between the two topologies between each status change and the data packets are assigned to the relevant topology "color". Alternatively, the network can run with the red topology as the quiescent or pre-change topology. In that case once the transition to a post-change blue topology is complete, a second transition back to the red topology—corresponding to the post-change blue topology—takes place by first creating a red topology which is congruent with the blue topology and, when that is complete, marking and classifying the packets as red packets using the transition mechanism described above.

It will further be appreciated that the techniques described above can be used to manage any type of change in any component of the network. For example a change can be in relation to a node or a link and can be, in addition to the failure of one or more components, a cost change in a link, addition of a link or planned removal of a network component.

It will yet further be appreciated that there may be multiple pre-change topologies running concurrently to which respective data traffic is assigned in which case the approaches described herein can be applied to each pre-change topology, transitioning to respective post-change topologies when affected by a network component change, simply requiring appropriate processing and database capability at each node.

One aspect of network change management that can be accommodated using the approaches described herein is in relation to traffic dependent metrics. A network implementing traffic dependent metrics will, for example, modify link costs depending on the traffic volumes throughout the network. Such a network can be considered as a network that is in continuous convergence. The skilled reader will be familiar with approaches for implementing traffic dependent metrics such that detailed discussion is not required here. However techniques have not been demonstrated for managing the transition between network states which, if not correctly managed, can give rise to network transients causing significant network disruption to traffic.

Figure 5:
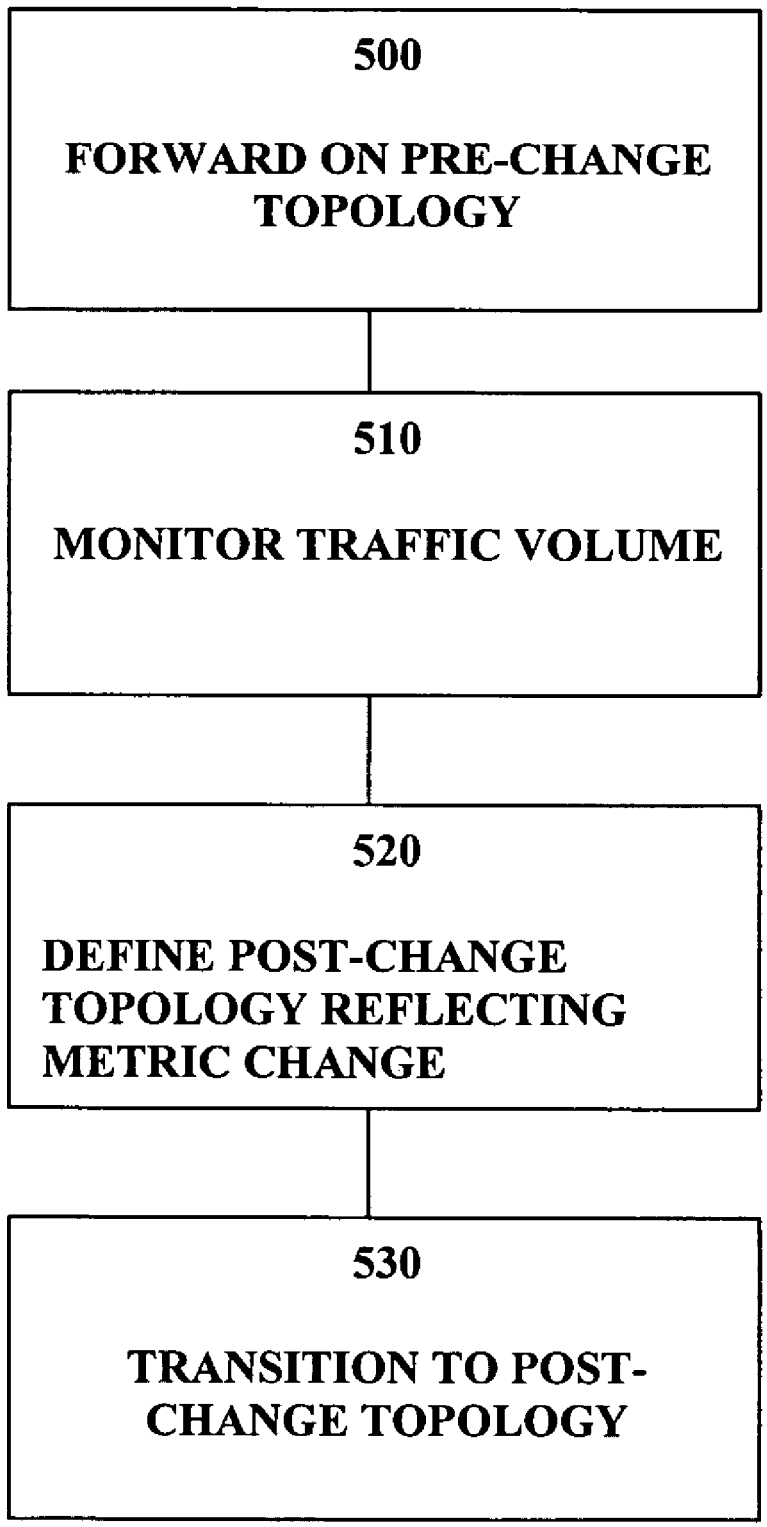
FIG. 5 is a flow diagram illustrating steps involved in managing a traffic dependent metric network change.

Referring to FIG. 5 which is a flow diagram illustrating implementation of a method described herein in relation to a network having traffic dependent metrics, in block 500 a node forwards traffic on a pre-change topology. In block 510 the node monitors traffic volumes and in block 520 the node generates a post-change topology reflecting a traffic dependent metric change, for example an increase in link cost across a link carrying excessive traffic such that some traffic is redirected. In block 530 the node then transitions to the post-change topology thus defined according to the approach described in more detail above. As a result continuous convergence of the network is attained.

It will be seen that the methods described herein provide a range of advantages and in particular allow a single transition to a new topology encompassing failures which provides faster ordered invocation even than for a single failure and avoids the use of tunnels. In addition synchronization techniques ensure that an epoch based synchronization approach does not become desynchronized, and the method can be applied to a range of implementations providing significant versatility. The approach can be applied to any quality of service (QoS) dependent routing network.

The transition topology can be one of various active topologies or a union of active topologies. Alternatively the transition topology can be defined separately (although this is likely to increase the computational burden and time for the transition to take place). The transition topology must, however, consist of all nodes common both to the new and old topologies and selection of one of the old or new topologies is an optimization as these topologies are clearly already defined.

The mechanisms by which the methods and optimizations discussed above are implemented will be well known to the skilled reader and do not require detailed discussion here. For example any manner of classifying data packets can be adopted. Similarly any manner of marking the packets and identifying the marked packets can be adopted. Prioritization of marked packets and assignment of those packets to the transition topology can be built in at each node or appropriate instructions can be carried by the marked packets.

4.0 Implementation Mechanisms—Hardware Overview

Figure 6:
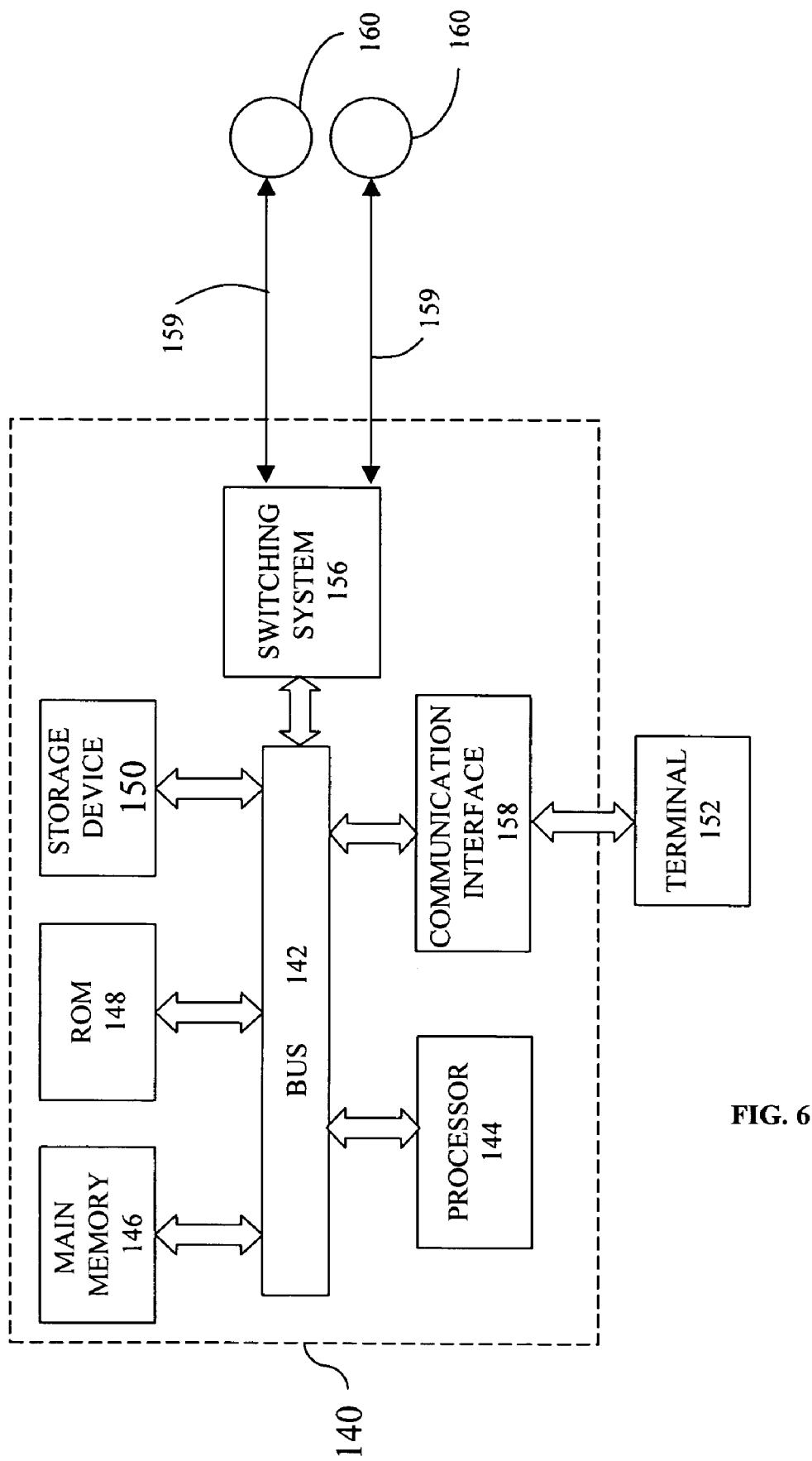
FIG. 6 is a block diagram that illustrates a computer system on which a method of managing a transition between topologies may be implemented.

FIG. 6 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a transitioning node the above described method of managing a topology transition. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. Aspects from the examples and embodiments described can be juxtaposed or interchanged as appropriate.

It will be appreciated that any appropriate routing protocol can be used such as Intermediate System—Intermediate System (IS-IS) or Open Shortest Path First (OSPF). Similarly any appropriate network can provide the platform for implementation of the method. The method can be applied to EP routing or any other multi-topology routing. Any appropriate marking or signaling method can similarly be adopted.

What is claimed is:

1. A method of managing a network component change in a data communications network having as components nodes and links defining a pre-change topology, comprising the steps, performed at a transitioning node, of:
    forwarding all data assigned to the pre-change topology via the pre-change topology;
    defining a post-change topology;
    assigning all data assigned to the pre-change topology to the post-change topology;
    transitioning from the pre-change to the post-change topology;
    forwarding the data assigned to the post-change topology via the post-change topology;
    assigning the pre-change topology to a first topology space and the post-change topology to a second topology space;
    after transition to the post-change topology, rendering the first topology space congruent with the second topology space; and
    transitioning from the post-change topology in the second topology space to the first topology space.

2. A method as claimed in claim 1 in which the network component change comprises at least one of a single or multiple component failure, additional or planned removal of a component, or variation of a component metric.

3. A method as claimed in claim 1 in which the step of defining a post-change topology comprises the step of converging a post-change topology.

4. A method as claimed in claim 1 further comprising the step of ceasing marking when all transitioning nodes have implemented the marking step and subsequently forwarding data via the post-change topology.

5. A method as claimed in claim 1 in which a data packet to be forwarded carries a marking representing a pre-change topology or a post-change topology.

6. A method as claimed in claim 1 in which the transitioning step is synchronized to an epoch.

7. A method as claimed in claim 6 further comprising the steps, performed at the transitioning node, of:
    receiving a synchronization signal from a master node; and
    commencing a transition epoch on receipt of the synchronization signal.

8. A method as claimed in claim 6 further comprising the step, performed at the transitioning node, of detecting a network clock signal and commencing a transition epoch upon said detection.

9. A method as claimed in claim 6 further comprising the steps, performed at a transitioning node, of:
    commencing a transition epoch;
    during a hold-down period receiving all notifications concerning network changes during the epoch;
    terminating the hold-down period;
    during a processing period, defining a post-change topology representing all network changes during the epoch;
    terminating the processing period; and
    transitioning to the post-change topology.

10. A method as claimed in claim 9 in which the transitioning node commences the transition epoch upon receipt of a notification of a network change in that epoch.

11. A method as claimed in claim 9 in which the transitioning node terminates the hold-down stage upon receipt of notification of a network change in a later epoch.

12. A method as claimed in claim 1 in which the network component change comprises a traffic volume dependent component metric change and in which the post-change topology represents the topology with the changed component metric.

13. A method as claimed in claim 1 in which the transitioning step comprises the steps of:
    defining a transition topology;
    marking data to be transitioned as assigned to the transition topology; and
    forwarding marked data via the transition topology.

14. A method of managing a network having traffic dependent metrics in a data communications network having as components nodes and links defining a first traffic dependent topology comprising the steps, performed at a transitioning node of:
    forwarding data via the first traffic dependent topology;
    defining a second traffic dependent topology representing a traffic dependent network component change;
    transitioning from the first to the second traffic dependent topology;
    forwarding data via the second traffic dependent topology;
    assigning the first traffic dependent topology to a first topology space and the second traffic dependent topology to a second topology space;
    after transition to the second traffic dependent topology, rendering the first topology space congruent with the second topology space; and
    transitioning from the post-change topology in the second topology space to the first topology space.

15. A method as claimed in claim 14 in which the transitioning step comprises the steps of:
    defining a transition topology;
    marking data to be transitioned as assigned to the transition topology; and
    forwarding marked data via the transition topology.

16. A computer readable storage medium comprising one or more sequences of instructions for managing a network component change in a data communications network which, when executed by one or more processors, cause the one or more processors to perform:
    forwarding all data assigned to the pre-change topology via the pre-change topology;
    defining a post-change topology;
    assigning all data assigned to the pre-change topology to the post-change topology;
    transitioning from the pre-change to the post-change topology;
    forwarding the data assigned to the post-change topology via the post-change topology;
    assigning the pre-change topology to a first topology space and the post-change topology to a second topology space;
    after transition to the post-change topology, rendering the first-topology space congruent with the second topology space; and
    transitioning from the post-change topology in the second topology space to the first-topology space.

17. The computer readable medium of claim 16 in which the network component change comprises at least one of a single or multiple component failure, additional or planned removal of a component, or variation of a component metric.

18. The computer readable medium of claim 16 in which defining a post-change topology comprises converging a post-change topology.

19. The computer readable medium of claim 16, further comprising:
ceasing marking when all transitioning nodes have implemented the marking step and subsequently forwarding data via the post-change topology.

20. The computer readable medium of claim 16 in which a data packet to be forwarded carries a marking representing a pre-change topology or a post-change topology.

21. The computer readable medium of claim 16 in which the transitioning step is synchronized to an epoch.

22. The computer readable medium of claim 21, further comprising:
receiving a synchronization signal from a master node; and
commencing a transition epoch on receipt of the synchronization signal.

23. The computer readable medium of claim 21, further comprising:
detecting a network clock signal and commencing a transition epoch upon said detection.

24. The computer readable medium of claim 21, further comprising:
commencing a transition epoch;
during a hold-down period receiving all notifications concerning network changes during the epoch;
terminating the hold-down period;
during a processing period, defining a post-change topology representing all network changes during the epoch;
terminating the processing period; and
transitioning to the post-change topology.

25. The computer readable medium of claim 24 in which the transition epoch is commenced upon receipt of a notification of a network change in that epoch.

26. The computer readable medium of claim 24 in which the hold-down stage is terminated upon receipt of notification of a network change in a later epoch.

27. The computer readable medium of claim 16 in which the network component change comprises a traffic volume dependent component metric change and in which the post-change topology represents the topology with the changed component metric.

28. An apparatus for managing a network component change in a data communications network having as components nodes and links defining a pre-change topology, comprising:
means for forwarding all data assigned to the pre-change topology via the pre-change topology;
means for defining a post-change topology;
means for transitioning from the pre-change to the post-change topology;
means for assigning all data assigned to the pre-change topology to the post-change topology; and
means for forwarding the data assigned to the post-change topology via the post-change topology;
means for assigning the pre-change topology to a first topology space and the post-change topology to a second topology space;
means, after transition to the post-change topology, for rendering the first topology space congruent with the second topology space; and
means for transitioning from the post-change topology in the second topology space to the first topology space.

29. An apparatus as claimed in claim 28 in which the network component change comprises at least one of a single or multiple component failure, additional or planned removal of a component, or variation of a component metric.

30. An apparatus as claimed in claim 28 in which the means for defining a post-change topology comprises the means for converging on a post-change topology.

31. An apparatus as claimed in claim 28 further comprising means for ceasing marking when all transitioning nodes have implemented the marking step and subsequently forwarding data via the post-change topology.

32. An apparatus as claimed in claim 28 in which a data packet to be forwarded carries a marking representing a pre-change topology or a post-change topology.

33. An apparatus as claimed in claim 28 in which the means for transitioning is synchronized to an epoch.

34. An apparatus as claimed in claim 33 further comprising:
means for receiving a synchronization signal from a master node; and
means for commencing a transition epoch on receipt of the synchronization signal.

35. An apparatus as claimed in claim 33 further comprising means for detecting a network clock signal and commencing a transition epoch upon said detection.

36. An apparatus as claimed in claim 33 further comprising:
means for commencing a transition epoch;
means, during a hold-down period, for receiving all notifications concerning network changes during the epoch;
means for terminating the hold-down period;
means, during a processing period, for defining a post-change topology representing all network changes during the epoch;
means for terminating the processing period; and
means for transitioning to the post-change topology.

37. An apparatus as claimed in claim 36 in which the transitioning means commences the transition epoch upon receipt of a notification of a network change in that epoch.

38. An apparatus as claimed in claim 36 in which the transitioning means terminates the hold-down stage upon receipt of notification of a network change in a later epoch.

39. An apparatus as claimed in claim 28 in which the network component change comprises a traffic volume dependent component metric change and in which the post-change topology represents the topology with the changed component metric.

40. An apparatus as claimed in claim 28 in which the means for transitioning step comprises:
means for defining a transition topology;
means for marking data to be transitioned as assigned to the transition topology; and
means for forwarding marked data via the transition topology.

41. An apparatus of managing a network having traffic dependent metrics in a data communications network having as components nodes and links defining a first traffic dependent topology comprising:
means for forwarding data via the first traffic dependent topology;
means for defining a second traffic dependent topology representing a traffic dependent network component change;
means for transitioning from the first to the second traffic dependent topology; and
means for forwarding data via the second traffic dependent topology;
means for assigning the first traffic dependent topology to a first topology space and the second traffic dependent topology to a second topology space;

means, after transition to the second traffic dependent topology, for rendering the first topology space congruent with the second topology space; and means for transitioning from the post-change topology in the second topology space to the first topology space.

42. An apparatus as claimed in claim 41 in which the transitioning means comprises:

means for defining a transition topology;

means for means for marking data to be transitioned as assigned to the transition topology; and means for forwarding marked data via the transition topology.

43. An apparatus for managing a network component change in a data communications network, the apparatus comprising:

one or more processors; and a network interface communicatively coupled to the one or more processors and configured to communicate one or more packet flows among the one or more processors and a network; and a computer readable medium comprising one or more sequences of instructions for managing a network component change in a data communications network which, when executed by one or more processors, cause the one or more processors to perform:

forwarding all data assigned to the pre-change topology via the pre-change topology;

defining a post-change topology;

assigning all data assigned to the pre-change topology to the post-change topology;

transitioning from the pre-change to the post-change topology;

forwarding the data assigned to the post-change topology via the post-change topology;

assigning the pre-change topology to a first topology space and the post-change topology to a second topology space;

after transition to the post-change topology. rendering the first-topology space congruent with the second topology space; and transitioning from the post-change topology in the second topology space to the first-topology space.

44. The apparatus as recited in claim 34 in which the network component change comprises at least one of a single or multiple component failure, additional or planned removal of a component, or variation of a component metric.

45. The apparatus as recited in claim 43 in which defining a post-change topology comprises converging a post-change topology.

46. The apparatus as recited in claim 43, further comprising:

ceasing marking when all transitioning nodes have implemented the marking step and subsequently forwarding data via the post-change topology.

47. The apparatus as recited in claim 43 in which a data packet to be forwarded carries a marking representing a pre-change topology or a post-change topology.

48. The apparatus as recited in claim 43 in which the transitioning step is synchronized to an epoch.

49. The apparatus as recited in claim 48, further comprising:

receiving a synchronization signal from a master node; and commencing a transition epoch on receipt of the synchronization signal.

50. The apparatus as recited in claim 48, further comprising:

detecting a network clock signal and commencing a transition epoch upon said detection.

51. The apparatus as recited in claim 48, further comprising:

commencing a transition epoch;

during a hold-down period receiving all notifications concerning network changes during the epoch;

terminating the hold-down period;

during a processing period, defining a post-change topology representing all network changes during the epoch;

terminating the processing period; and transitioning to the post-change topology.

52. The apparatus as recited in claim 51 in which the transition epoch is commenced upon receipt of a notification of a network change in that epoch.

53. The apparatus as recited in claim 51 in which the hold-down stage is terminated upon receipt of notification of a network change in a later epoch.

54. The apparatus as recited in claim 43 in which the network component change comprises a traffic volume dependent component metric change and in which the post-change topology represents the topology with the changed component metric.

* * * * *